United States Patent [19]

Luxemburg

[11] Patent Number: 4,599,117
[45] Date of Patent: Jul. 8, 1986

[54] PROCESS FOR THE DECONTAMINATION OF OIL-CONTAMINATED PARTICULATE SOLIDS

[76] Inventor: S. Roy Luxemburg, 10530-424 Florida Blvd., Baton Rouge, La. 70815

[21] Appl. No.: 614,816

[22] Filed: May 29, 1984

Related U.S. Application Data

[63] Continuation-in-part of Ser. No. 346,202, Feb. 5, 1982, Pat. No. 4,451,377.

[51] Int. Cl.$^4$ .............................................. B08B 7/04
[52] U.S. Cl. .................................... 134/25.1; 134/40; 175/66; 210/708
[58] Field of Search ........................ 134/7, 40, 25.1; 208/8 R; 210/708, 712, 725, 727, 730–734, 777, 778, 806, DIG. 5; 166/267; 175/66, 206

[56] References Cited

U.S. PATENT DOCUMENTS

| | | | |
|---|---|---|---|
| 3,080,971 | 3/1963 | Hutto et al. | 210/778 |
| 3,433,312 | 3/1969 | Burdyn et al. | 175/66 |
| 3,493,499 | 2/1970 | Zeitoun et al. | 210/727 |
| 3,637,031 | 1/1972 | Hull et al. | 175/66 |
| 3,716,480 | 2/1973 | Finley et al. | 210/202 |
| 3,737,037 | 6/1973 | Bone | 175/66 |
| 4,127,482 | 11/1978 | Watson et al. | 210/727 |
| 4,174,278 | 11/1979 | Tramier et al. | 210/728 |
| 4,238,330 | 12/1980 | Fong et al. | 210/708 |
| 4,242,146 | 12/1980 | Kelly, Jr. | 134/40 |
| 4,304,609 | 12/1981 | Morris | 134/19 |
| 4,335,001 | 6/1982 | Yves et al. | 210/DIG. 5 |
| 4,353,803 | 10/1982 | Dover | 210/728 |
| 4,451,377 | 5/1984 | Luxemburg | 134/40 |
| 4,480,702 | 11/1984 | Kelly, Jr. | 175/206 |

Primary Examiner—Peter Hruskoci
Attorney, Agent, or Firm—Llewellyn A. Proctor

[57] ABSTRACT

A process for cleaning oil-contaminated particulate solids, or drill cuttings such as obtained from a well bore. Oil-contaminated particulate solids are admixed with an aqueous polymeric solution, and preferably also a filter aid, and oil-decontaminated solids are separated therefrom. The oil-contaminated solids are rendered environmentally acceptable for discharge, and the oil can be recovered.

7 Claims, 1 Drawing Figure

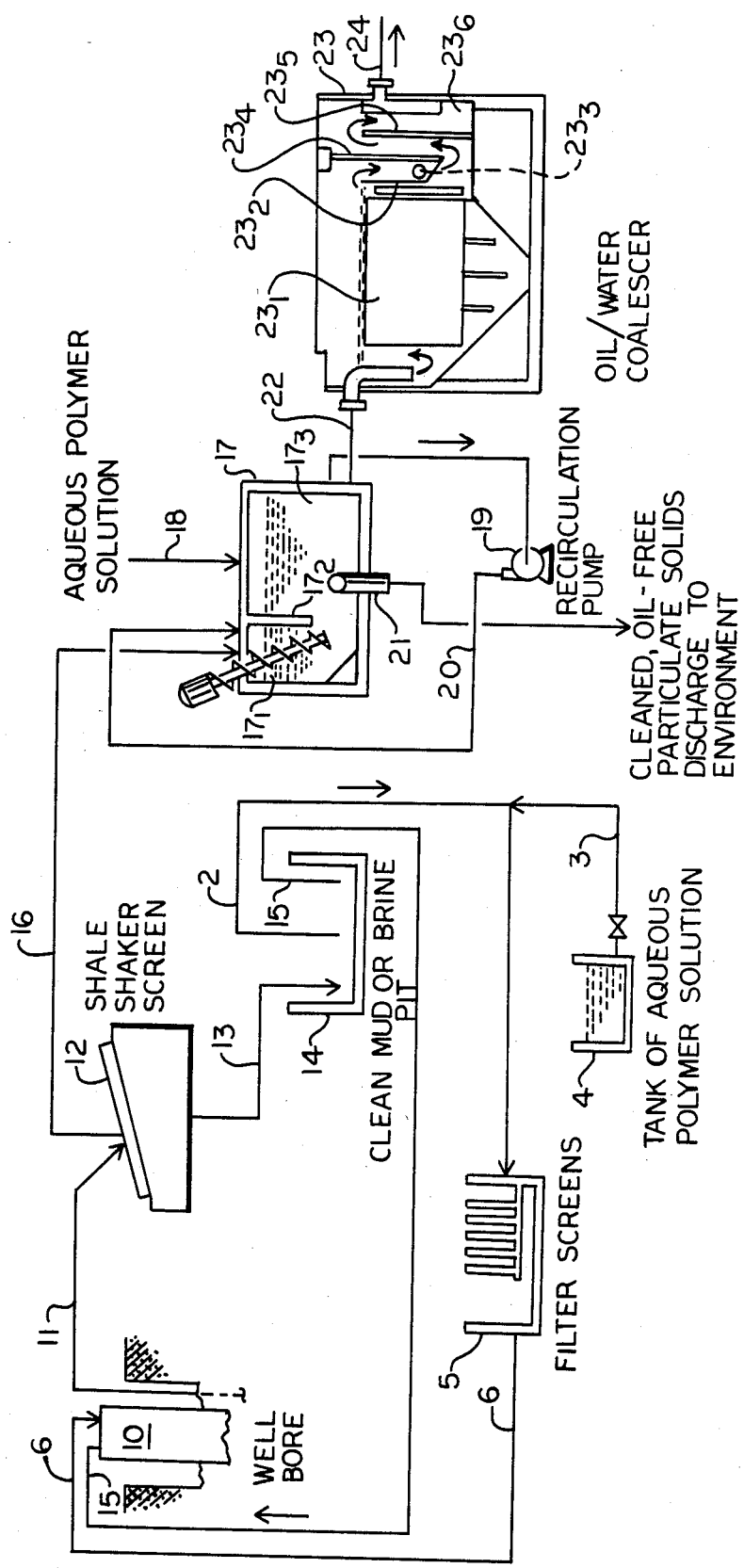

PROCESS FOR THE DECONTAMINATION OF OIL-CONTAMINATED PARTICULATE SOLIDS

RELATED APPLICATIONS

This is a continuation-in-part of application Ser. No. 346,202, filed Feb. 5, 1982, now U.S. Pat. No. 4,451,377. This Application, entitled "Process For The Decontamination of Oil-Contaminated Well Bore Fluids, or Particulate Solids", is incorporated by reference.

BACKGROUND OF THE INVENTION

1. Field of the Invention

This invention relates to a process for the decontamination of oil-contaminated particulate solids, especially oil-contaminated particulate solids as removed from an oil well bore. In particular, it relates to the cleaning of oil-contaminated drill cuttings, and the separation and removal of oil therefrom.

2. Background and Prior Art

In rotary drilling, as practiced in oil and gas exploration, a well bore is formed which extends downwardly from the earth's surface to an oil or gas producing stratum. Formation of the well bore requires cutting into the earth with a rotating bit attached to the end of a drill string formed from joints of pipe sequentially attached as the well bore is extended downwardly. Various fluids are employed in well bore formations, as for drilling, completions and workover operations. Exemplary of these are (1) drilling fluids, or "muds", which are clay-based, and (2) brines which are clay-free, clear, heavy (dense) fluids. Drilling fluids, or muds, are generally used, and clear fluids or brines less often, during drilling operations. Brines are most often used for well completions and workovers. By definition, a workover is any operation in the well bore other than drilling. By this definition, completion operations comprise the first "workover".

In drilling the well bore, generally a clay-based drilling fluid, or mud, constituted of a mixture of weighting materials, clays, chemicals and water or oil, is pumped downwardly through the drill string as the well is drilled to exit through jets in the drill bit at the bottom of the hold, the mud ascending to the surface via an annular space between the exterior wall of the drill string and the wall of the hole, or well bore, which may be walled with well casing. At the surface, the mud is pumped to a shale shaker equipped with one or more layers of vibrating screens of one to three, or more mesh sizes for drill cuttings removal. The mud, after removal of the drill cuttings, is then returned to a mud pit where it is temporarily stored for reuse. The drilling fluid, or mud, or brine if it is used in drilling operations, serves several essential functions, the most important of which is to (1) control subsurface pressures and maintain stability, (2) cool and lubricate the drilling tool or bit, (3) suspend and transport to the surface all movable solids, notably drill cuttings, (4) provide rheologically-stable flow or circulation for the purposes characterized in (2) and (3), supra, and (5) provide a chemically stable or compatible chemical environment within the well bore. The chemically stable environment will minimize or eliminate corrosion of the drill string and casing as well as provide a compatible environment to the formations encountered in order to seal off permeable formations of oil, gas or water as the well is drilled through different subterranean formations and strata. In the event of a shutdown in the drilling operation, the purpose of the mud, or brine if used in drilling operations, is to hold the cuttings, sand and other solids particulates, or residual solids materials in suspension within the column of drilling fluid while efforts are being made to maintain or restore circulation of the drilling fluid.

In U.S. Pat. No. 3,737,037 which issued on June 5, 1973 to Lee Bone, III, there is described a process for treating drilling mud to remove substantially all of the suspended solids particles to provide a reusable mud. The drill cuttings, as is conventional, are removed via use of a shale shaker and the mud is then dumped into a mud pit. The smaller solids particles of size ranging down to about 20 microns in diameter are separated from the mud downstream of the shale shaker and mud pit by use of a series of centrifuges. A conventional decanting centrifuge is employed in series with a cyclone centrifuge, the decanting centrifuge being employed to remove the weighting solids, or barite particles from the mud, while the cyclone centrifuge is used to remove the smaller particles from the mud. Downstream of the series of centrifuges, the solids of size smaller than 20 microns re removed from the mud by the addition of flocculating agents to a tank of the mud, and the mud is then filtered to remove the flocculates. The mud, essentially free of solids, is then returned to the mud pit where it is available for reuse. There is no mention whatever, inter aba, within the metes and bounds of the bone patent of treating clear brine drilling fluids.

The drill cuttings when brought to the surface, and separated from the mud, are contaminated with oil. Residual mud solids recovered from the mud pit may likewise be highly oil-contaminated. In fact, at one time it was highly desirable to use oil based muds comprising various solids mixed with diesel oil, e.g. typically 1 to 15 percent by volume diesel fuel, for torque reduction or viscous drag reduction on the drill string to suppress or prevent sticking of the drill string. This very useful practice, once common, is not now often used because of the oil contamination and oil-slick problem. Oil contamination of these solids, particularly the drill cuttings, presents a pressing disposal problem for the solids cannot be simply dumped because of oil pollution problems. This means, of course, that diesel oil is rarely ever added to muds solely for lubrication purposes, despite the advantages. Instead, more expensive mineral oils are used in oil-based muds on a permit basis. Significant economies may also be achieved due to the desire, and need to recover the oil, but are particularly due to the need to dispose of a troublesome waste material. Thus, there is a pressing need for processes suitable for decontamination of the oil-contaminated solids so that they may be discarded or discharged without causing pollution of the environment. Also, there is a need for recovery of the oil separated from the solids and a need to clean up the water used in drilling a well.

It is, accordingly, the primary objective of this invention to fulfill these needs.

It is a specific object to provide a process for the cleaning of oil from oil-contaminated particulate solids, particularly oil-contaminated drill cuttings, and for the demulsification, separation, and recovery of the oil removed from the solids.

THE INVENTION

These objects and others are achieved in accordance with this invention, a process wherein an aqueous solution of a water-soluble polymer, described hereafter, is admixed with oil-contaminated particulate solids, or drill cuttings which have been separated or removed from a drilling fluid or mud, the particulate oil-contaminated solids, or drill-cuttings freed of oil, and the oil-free particulate solids, or drill-cuttings thereby rendered environmentally acceptable for discharge to the environment.

In the preferred practice of this invention, oil-contaminated particulate solids or drill cuttings are separated from the drilling fluid, or mud in conventional manner at the cuttings washer, the drill cuttings are then admixed with an aqueous solution of the water-soluble polymer, and the solution and drill cuttings vigorously agitated as with a mixer or stirrer to clean the solids of oil, and produce separation of the oil from the solids. In other words, the oil-contaminated drill cuttings are first recovered from the drilling fluid, a mud or clear fluid, or a brine, which is then continuously circulated from the well back to the settling pit. The drilling mud removes the oil-contaminated drill solids particles, or cuttings, from the bottom of the well bore, and they are carried within the well bore outside the drill string to the surface where the oil-contaminated particles, typically larger than 200 mesh size (American Standard series), are removed at the shale shaker located upstream of the settling pit. The shale shaker is particularly useful when drilling muds are used, since the cuttings are typically larger than the 200 mesh size. Solids smaller than 200 mesh size are dropped through the shale shaker screens and returned to the mud pit which supplies drilling fluid for the well bore.

The oil-contaminated solids, or drill cuttings separated from the shale shaker are, in a preferred embodiment, admixed with a filter aid, suitably a diatomaceous earth, and the polymeric solution, at least the major portion of the solids particles settling to the bottom of the aqueous liquid as masses freed oil, these oil-decontaminated solids being readily separated from the aqueous liquid by flocculation, decantation or filtration, preferably by flocculation or decantation. The oil-decontaminated solids are readily disposed of at either an on-shore or off-shore drilling site.

The polymeric solution and oil-contaminated particulate solids, and preferably a filter aid such as a diatomaceous earth, in a preliminary step, preferably thoroughly admixed, suitably by the turbulent action of a mixer, e.g. a stirrer or other type of mechanical agitator, at ambient temperatures, or temperatures ranging from about 5° C. to about 40° C., preferably at temperatures ranging from about 15° C. to about 30° C., to wash, leach out, and demulsify the oil. The liquid, which now contains the oil, may then be decanted and separated from the decontaminated solids. The oil-decontaminated solids, on the other hand, may be filtered and separated from the liquid. Oil, in either event, is generally recovered as a discrete phase which floats on top of the liquid after passage of the liquid through the filter. The action of the polymers upon the solids enables the oil to pass through filters which are known to be highly oil-absorbent. This constitutes a unique feature of this invention.

Various types and virtually any type of filter can be used in the separation, and removal of oil from the admixture of the polymeric solution, filter aid, and particulate solids, viz. gravity filter, pressure filters, or vacuum filters, this including intermittent vacuum filters and continuous vacuum filters; this being a classification of filters according to the nature of the driving force that causes filtration. Or, if described in terms of their mechanical characteristics useful filters are those which can be termed plate-and-frame filters, leaf filters, rotary drum filters, top feed filters, disc-type filters, sand bed filters and precoat filters. Leaf filters have proven particularly effective in the practice of this invention, the leafs supporting the filter medium through which the pre-mixed polymeric solution filter aid and the oil-contaminated fluids have been passed, with the aid of a vacuum, pressure, or gravity driving force, to produce separation, and recovery of the oil in the liquid phase after passing through the filter, as well as the cleaning, and decontamination of the solids. The oil is also cleaned of solids often to the extent of the removal of the color bodies in the oil, this suggesting a use for this process in the washing and filtration of oil emulsions.

The solids are oil-free and can readily be disposed of without risk of contaminating the environment. Surprisingly, the oil "rides through" the filter, essentially no oil remaining on the filter cake which can also be discharged with the solids without risk of contamination of the environment. It has been found advantageous to mount a stirred tank and filter press in series on a vehicle, e.g. a truck, barge or boat, measured amount of the polymeric solution, filter aid and oil-contaminated particulate solids being charged into, and admixed within the stirred tank, the admixture then being charged into the filter press for separation of the cleaned solids, and recovery of oil.

In a particularly preferred embodiment of this invention, the particulate solids, or drill cuttings removed from the cuttings washer are, while in admixture with water, ground or otherwise attrited and the particle size thereof reduced. The ground particulate solids, as a slurry, are transferred to an adjacent water-containing zone. Polymeric solution is added thereto, and admixed therewith, sufficient to produce separation of the oil from the particulate solids, the oil forming an emulsion with the aqueous liquid contained within the zone. The particulate solids, free of oil, are separated from the liquid and removed from the zone. The admixture of oil and aqueous liquid is then transferred from the zone to a coalescer wherein the oil is retained and separated from the aqueous liquid, and recovered. The liquid can be recycled or discharged as an oil-free waste.

The particulate solids, in all embodiments, after separation from the drilling fluid, i.e. brine or drilling mud, is immersed in an aqueous solution to which the polymer is added. Polymers useful in the practice of this invention are: (1) water-soluble polyacrylamides, particularly the more highly anionic species, which are preferred. Exemplary of the polyacrylamides are the "poly flocs" or "Separans" marketed by Dow Chemical Company under the formulas Dowell M-144, Dowell M-172, Dowell M-173, the "Cyflocs" marketed by American Cyanamid as formulas 4000, 4010, 4020 and 4500, and the "Hercoflocs" marketed by Hercules Chemical Company; of which the more highly anionic compositions are preferred, e.g., Dow's Dowell M-144 or American Cyanamid's Cyfloc 4000; (2) water-soluble poly (acrylic acid) and its homologues, e.g. poly (methacrylic acid), their salts, and copolymers of acrylic acid and methacrylic acid with their hydrophobic or hydrophilic comonomers; (3) water-soluble poly (ethylene oxide) resins, exemplary of which are those sold commercially by Union Carbide Corporation under the Polyox trademark, e.g. Polyox 301, WSR-N-80, WSR-N-750 and the like, or as produced by Meisei Chemical Works Ltd. sold under the trademark Alkox, or by Seitetsu Kagaku Co., Ltd. under the trademark PEO; (4) polyvinyl alcohol, the only linear polyhydroxy polymer which is readily water soluble, exemplary of which is Elvanol, a trademark product sold by DuPont Chemical Co.; (5) water-soluble carboxymethylcellulose, exemplary of which is sodium carboxymethylcellulose, hydroxyethylcellulose, hydroxypropylcellulose, hydroxypropylmethylcellulose and admixtures thereof which are produced worldwide by numerous industrial concerns under various trademarks, viz. CMC-T by Hercules, Inc., Edifas B by Imperial Chemicals Industries, Ltd., Methocel by Dow Chemical Company, etc.; (6) soluble gums known as carrageenans which occur in certain species of red seaweeds of the Gigartinaceae, Solieriaceae, Phyllophoraceae, and Hypneaceae families. Chemically these are sulfated linear polysaccharides of D-galactose and 3,6-anhydro-D-galactose and, by virtue of the half-ester sulfate groups are polyelectrolytes; and (7) guar gum, a readily water-soluble carbohydrate polymer constituted as a chain of Beta-D-mannopyranosyl units linked (1–4) with single-membered Alpha-D-galactopyranosyl units occurring as side branches; the Alpha-D-galactopyranosyl units being linked (1–6) with the main chain.

The polymer is dissolved in water, or aqueous solution, in concentration sufficient that when the solids are admixed with the solution, oil will be removed from the particulate solids, and the oil demulsified. The polymer is generally predissolved, for convenience, in water in concentration ranging from about 500 parts of polymer per million parts by weight of water (ppm) up to the point of saturation, or from about 500 ppm to about 3 percent, or 5 percent depending on the nature of the polymer. This solution is then added to the aqueous solution which contains the particulate solids. Suitably, the aqueous polymeric solution with which the oil-contaminated particulate solids are contacted, immersed or otherwise treated will contain from about 5 parts of polymer, per million parts by weight of the water (ppm), to about 3 percent of the polymer, based on the weight of the polymer and water, and preferably from about 500 ppm to about 1 percent of polymer is added to the water to form the solution. The polymeric solution and particulate solids on being added one to the other will be thoroughly admixed. In admixing the polymeric solution and particulate solids preferably sufficient of the polymeric solution is added to form a discrete liquid phase within which the particulate solids are dispersed. Preferably, a filter aid, suitably a diatomaceous earth, is also added to the solution. Suitably from about 0.1 percent to about 2 percent, preferably from about 1 percent to about 2 percent, of the filter aid is incorporated with the polymer solution, based on the total weight of the solution and filter aid.

The diatomaceous earths are a preferred type of filter aids which are useful in the practice of this invention. Diatomite, or kieselguhr, a hydrous form of silica or opal composed of the siliceous shells of diatoms, which are unicelled aquatic plants of microscopic size, has long been used as a filtering aid, and is particularly useful in the practice of this invention. Other useful materials are, e.g., bone char, Vermiculite, charcoal, Fuller's earth, acid-treated clays, bauxite, activated alumina, silica gel, asbestos, sawdust, and the like. Decolorizing carbons and earths, such as commercially known Darco, Carbrox, Suchar, Norit, Filtrol, Palex, and activated clays which are oil adsorbent materials are rendered non-adsorbent and are therefore particularly useful in the practice of this invention.

These and other characteristics of a preferred particulate solids oil-decontamination process, and its principle of operation, will be more fully understood by reference to the following detailed description, and to the attached drawing to which reference is made as the description unfolds.

The FIGURE depicts a flow scheme in accordance with the process of this invention.

Referring generally to the FIGURE there is shown a well head 10 which extends downwardly from the surface into the earth, and from which there is withdrawn via line 11 a drilling fluid, or mud. The mud is conveyed via line 11 to a shale shaker depicted graphically as a shale shaker screen 12 through which the mud and very, very fine particulate solids are passed via line 13 to the mud pit 14. Clean mud or brine from the mud pit is recycled to the well bore 10.

In accordance with one option, the clean mud or brine from the clean mud or brine pit 14 is directly recycled via line 15 to the well bore 10. In another option, the clean mud or brine from the pit 14 is passed via line 2, and admixed in said line 2 with an aqueous solution of the polymer fed therein via line 3 from a tank 4 containing the aqueous polymer solution to flocculate the solids. The admixture of clear fluid or brine and aqueous polymer solution is then filtered by passage of the admixture through filter screens 5 and the filtered solution, free of flocculated solids, is then sent back to the well bore 10 via line 6.

Oil-contaminated drill cuttings are retained by the shale shaker screen 12, separated from the mud, and passed via line 16 to an aqueous liquid filled compartmented tank 17, within a first compartment $17_1$ of which there is mounted one or a pair of helicoid screws 18. The oil-contaminated drill cuttings are introduced via line 16 into the first compartment $17_1$ and therein are ground, or pulverized, to a fine powder and then passed under the baffle $17_2$ into the aqueous liquid filled second compartment $17_3$ of the tank. An aqueous solution of the desired polymer is added to compartment $17_3$ via line 18 sufficient in amount that when admixed with the water it will decontaminate the oil-contaminated solids and produce demulsification of the oil. Generally, sufficient of the polymer is added to provide a concentration of polymer ranging from about 5 ppm to about 3 percent, or higher, and preferably from about 500 ppm to about 1 percent. Aqueous solution is pumped by the use of a pump 19 through line 20 and reintroduced into compartment $17_1$. Cleaned, oil-free particulate solids are removed from compartment $17_3$ via conduit 21 and discharged as waste to the environment. Oil and water, largely as an emulsion, are transferred from compartment $17_3$ via line 22 to a coalescer 23, or oil-water separator.

Various coalescers or oil-water separators can be used to separate the oil and water, as required in accordance with the practice of this invention. One type of suitable coalescer is that manufactured and sold by Great Lakes Environmental, which is known as the Great Lakes Slant Rib Coalescing (SRC) Separator. This type of coalescer is capable of effectively separating oils and oils and solids from water.

Oil and water thus flow through line 22 into coalescer 23 which contains a bundle of plastic tubes $23_1$ which has oleophilic, or oil attracting characteristics. As fine oil droplets impinge upon the plastic tubes they are attracted to, and adhere thereupon. The fine droplets of oil merge with previous fine droplets of oil, increase in size, then rise to the surface to form a layer of oil floating on a surface of water. The oil is skimmed from the surface of the coalescer via an oil skimmer $23_2$, and is passed via an outlet $23_3$ to the exterior of the coalescer, collected and stored. An oil-free aqueous solution is passed via an opening beneath the baffle $23_4$, and over the top of baffle $23_5$ to the compartment $23_6$ from which it is withdrawn via line 24 as an oil-free discharge.

The process of this invention, and its principle of operation, will be more fully understood by reference to the following non-limiting examples, and data.

EXAMPLE 1

A 17,000 gallon quantity of a used, dirty, dark-in-color, aqueous $CaBr_2CaCl_2$ solution obtained from a Venice, La. well, having a specific gravity of 13.8 pounds/gallon, containing 0.41 wt. % oil, and 6 wt. % solids, mostly bentonite and montmorillonite, was admixed with 170 gallons of an aqueous solution, containing from 5 to 10 parts by weight of Dowell M-144 (a highly anionic polyacrylamide) per 1000 parts by weight of water, in a large tank on which was mounted a mechanical stirrer.

A portion of the admixture was thoroughly agitated with diatomaceous earth which was added thereto, this having been accomplished while stirring with the mechanical stirrer, rotated at 400 rpm for a period of 20 to 25 minutes. The admixture was then filtered by passage through an 86 square foot horizontal tank vertical leaf, pressure filter at pressures up to 70 psi, the filter passing 150 gallons/minute of the admixture through a two inch diameter line downstream of the filter. The filtrate was pumped from the two inch line into a clean tank.

It was found on examination, that all of the oil passed through the filter, the oil floating downstream of the filter atop a clear, transparent brine. The oil layer, which suppressed the normal hydroscopicity of the brine, was readily removable from the clear brine as by decantation. The diatomaceous earth obtained from the filter was found to contain no oil. Moreover, the brine is cleaned, regenerated and ready for reuse in a well.

EXAMPLE 2

Four ounces of a "Louisiana gumbo" clay from a Venice, La. well was admixed with an equal weight of an oil-base, or asphaltic material known as "Black Magic", with spatulas on a glass slide. The admixture was then admixed in a glass beaker with 16 ounces of water, which contained 2.5 wt. % NaCl, and 1.5 ounces of a 1 volume % solution of Dowell M-144 in water.

The admixture was then vigorously agitated by use of a magnetic stirrer. The solution was then permitted to settle. Upon settling, the admixture separated in a very clear, transparent solution atop which floated a layer of oil, essentially devoid of color bodies. At the bottom of the beaker was found a thin layer of barytes ($BaCO_3$), characterized as a dark brown powder. Near the bottom of the beaker also, just about the barytes, was found feather-like clumps and masses of particulates.

The Dowell M-144 solution broke up the gumbo, showing clearly that it was capable of "busting up", and cleaning the worst of drill cuttings. The oil, floating at the top of the liquid exhibited good fluorescence in U.V. light, solids separated from the filter, and beaker in contrast showed no fluorescence in U.V. light. These data clearly show that the solids are clean of oil and can be readily disposed of after treatment in a cuttings washer tank without environmental problems in accordance with the process of this invention.

A feature of this invention is that diesel fuel, "Black Magic" and similar lubricants can again be more widely used in drilling operations to increase the efficiency and speed of drilling, to suppress torque reduction, viscous drag reduction, and drill pipe sticking which can result in circulation loss and possible "fishing" operations. This can be done without waste of drilling fluids due to oil-contamination; since the drilling fluids and solids can be readily cleaned of oil and solids by the process of this invention.

EXAMPLE 3

A 450 ml. quantity of $CaBr_3/CaCl_2$ brine solution having a specific gravity of 13.8 pounds/gallon containing 6 wt. % solids and 0.41 wt. % oil was stirred with a spatula and placed without treatment into a Baroid filter press containing a standard Baroid filter paper (0.5 micron pore rating) which is placed across a stainless steel screen laid interiorly across the bottom of the press container. A 150 psi pressure was then applied to the surface of the solution as a driving force. After one and one-half hours only 30 ml. of the aqueous liquid had passed through the filter. At this time the filter was disassembled and the remaining unfiltered brine solution was poured into a beaker for later use. The filter paper with its filter cake was removed and placed aside for later comparison as was the 30 ml. quantity of filtered, untreated brine.

To the unfiltered remainder of the unfiltered brine previously placed in the beaker was added 5 to 6 ml. of a solution of 0.05 wt. % of Dowell M-144 in water. The resulting admixture was then vigorously stirred in a magnetic stirrer, then poured under ambient conditions into the Baroid filter press which had been previously cleaned and re-equipped with a standard Baroid filter paper. The Baroid paper was taken from the same package and placed fresh across the same stainless steel screen as before. A 150 psi pressure was then applied to the surface of the brine. In contrast to the previous one and one-half hours required to filter 30 ml. of the brine, the entire contents of the press, 426 ml., had passed through the filter in less than 30 minutes.

It was observed that the oil had floated to the surface of the newly filtered 426 ml. now contained in a clean beaker placed under the filter press. The filter paper was removed from the press. Filter cake was then carefully taken from the paper and placed in a 100 ml. beaker of water. The same was done for the filter cake previously obtained from the untreated brine. Both filter cake and water solutions were stirred briefly with a spatula and it was observed that a thin filmy "slick" appeared on the surface of the filter cake/water solution taken first from the filtration of the untreated brine. No "slick" was observed on the surface of the filter cake and water solution taken from the filtration of the polymer treated brine. This result was further verified when the surfaces of both 100 ml. beakers were illuminated by ultraviolet light. Fluorescence was observed on the surface of the small beaker containing the "slick". No fluorescence was observed on the surface of the small beaker containing the solution of filter cake and water which exhibited no "slick".

Interestingly, the same ultraviolet lamp was used to observe that no fluorescence occurred when the 30 ml. of filtered brine was illuminated, while the surface of the 426 ml. admixture of brine and polymer solution fluoresced brightly.

Both the untreated and treated filtrates were then tested for clarity and color by means of observation of each sample of filtered brine in the cell of a transmissometer (Hach Chemical Co., Loveland, Colo.). The treated brine exhibited more than 12% (percent) higher transmissivity than did the untreated brine.

These data also showed that the polymer treated filtrate contained solids of less than 2 microns in diameter, which means that the reused brine will not stop up, or block passages within a well in which it is used. Particles of greater size, e.g., 2 to 10 microns have been found to block passages within a well, slow up and even eventually stop the flow. It is clear too from the data that the polymeric treatment of brines besides removing oil, and solids, increases the filtering rate by at least 500 percent.

Repetition of the foregoing examples using Hercofloc 1018, 1021, 1027, 1031 and Cyfloc 4300 show that these polymers are also satisfactory for stripping oil from solids, or drill cuttings, as exemplified in the treatment of a Louisiana gumbo.

It is apparent that various changes, as in temperature, pressure, or the like can be made without departing the spirit and scope of the invention as will be apparent to those skilled in this art.

Having described the invention, what is claimed is:

1. A process for cleaning oil-contaminated particulate solids, which comprises
    adding said oil-contaminated solids to the first compartment of a water filled compartmented vessel, the compartments of which are separated by a baffle, with the first compartment containing one or more screws capable of pulverizing said particulate solids, and the water of one compartment admixing with water in the other,
    adding to a compartment of the vessel, an effective amount of a water soluble polymer selected from the group consisting of polyacrylamides, poly(acrylic acid), poly (ethylene oxide) resins, polyvinyl alochol, carboxymethylcellulose, carrageenan gums, and guar gums, to separate the oil from said solids and deumulsify said oil,
    pulverizing and reducing in size the solids added to said first compartment with said screws,
    passing said solids under said baffle and separating oil as an oil-in-water emulsion from said solids,
    separating oil-free solids from the second compartment of the vessel of water, and
    passing said oil and water emulsion from said compartmented vessel and demulsifying same for recovery of the oil as a separate phase.
2. The process of claim 1 wherein the water soluble polymer is contained in the aqueous solution in concentration ranging from about 5 ppm to about 3 percent, based on the weight of the aqueous solution.
3. The process of claim 2 wherein the concentration of the polymer ranges from about 500 ppm to about 1 percent.
4. The process of claim 1 wherein the polymer is polyacrylamide.
5. The process of claim 1 wherein drill cuttings constitute the oil-contaminated particulate solids.
6. The process of claim 1 wherein the oil-free solids are separated from the vessel of water while the oil and water emulsion is passed from said compartmented vessel of water to a coalescer wherein the oil and water are separated, and the oil recovered as a separate phase.
7. The process of claim 1 wherein one or more helicoid screws are used in the first compartment within which the solids are added, pulverized and reduced in size, a slurry of solids is passed from the baffled first compartment to the second compartment to which the polymer is added.

* * * * *